Patented July 1, 1924.

1,499,908

UNITED STATES PATENT OFFICE.

NEWCOMB K. CHANEY, OF KEW GARDENS, NEW YORK, ASSIGNOR TO NATIONAL CARBON COMPANY, INC., A CORPORATION OF NEW YORK.

PROCESS OF ACTIVATING CARBON.

No Drawing.   Application filed April 22, 1922.   Serial No. 556,079.

*To all whom it may concern:*

Be it known that I, NEWCOMB K. CHANEY, a citizen of the United States, residing at Kew Gardens, in the county of Queens and State of New York, have invented certain new and useful Improvements in Processes of Activating Carbon, of which the following is a specification.

This invention relates to processes of manufacturing highly active adsorbent carbon, and has particular reference to the treatment of carbonaceous material with chlorine and steam under regulated conditions.

In my application Serial No. 307,620, filed June 30, 1919, I have described and claimed processes for activating carbonaceous materials which comprise a potentially active carbon base saturated with adsorbed hydrocarbons. According to that application, such hydrocarbons are eliminated by oxidation with a suitable gaseous agent, preferably superheated steam, under conditions limiting decomposition of the active base. Adsorption-complexes of active carbon with hydrocarbons were termed "primary carbon" in my prior application and this designation will be applied here also to materials to be treated according to the present invention.

The improved process comprises preliminary treatment of heated primary carbon with gaseous chlorin, resulting in the chlorination of adsorbed hydrocarbons, followed by subjection of the carbon to the action of superheated steam to remove chlorin and chlorinated compounds, and to oxidize a limited amount of the carbon so that the remainder may acquire the requisite porosity. The steam treatment as described in detail in my application referred to above is applicable in the present process. The time required for activation is much reduced by the preliminary chlorination, as the adsorbed hydrocarbons are removed with considerably greater rapidity than when steam alone is used. Also, by the use of chlorin I am able to avoid the large weight loss due to unnecessary oxidation of the carbon by long exposure to superheated steam. The advantages of the present process will be further referred to in connection with the succeeding description.

Carbon from many sources is available for activation by the present method. It may be said that carbonaceous materials in general may be used unless they contain too large a proportion of inactive carbon. As was pointed out in the application mentioned above, graphite, and carbon which has been rendered inactive by subjection to high temperature, in the presence of carbonaceous gases, can not be activated in any practical manner. Among the materials which may be successfully treated are animal and vegetable charcoals, coke produced by low temperature distillation, peat, lignite, anthracite and bituminous coal, and carbon deposited at relatively low temperature by chemical or thermal decomposition of carbon-bearing materials. Where there is a large excess of hydrocarbons associated with the active base, as in bituminous coal, most of such hydrocarbons should be expelled by heating at moderate temperature before chlorinating.

One or more of these primary carbons, or equivalent material, is activated in a manner now to be described. The carbon in a relatively fine state of subdivision may be disposed in a thin layer and a current of gaseous chlorin passed therethrough, or it may be charged into a suitable agitating device, such as a rotary tube, and agitated in a continuously maintained chlorin atmosphere. The temperature will be elevated to a point at which the adsorbed hydrocarbons are readily chlorinated. This temperature varies according to the character of the hydrocarbons present and to a certain degree according to the density of the primary carbon. Low density carbon such as wood charcoal may be chlorinated at about 350° C.; denser materials, such as cocoanut charcoal, are best treated around 600° C. It is essential that the carbon particles should have an adequate exposure to the action of the gas, but the particular means for securing such exposure is unimportant. The treatment is continued until the chlorin has reacted with substantially all of the adsorbed hydrocarbons.

The foregoing treatment is followed by introduction of superheated steam, thus sweeping out any residual chlorin and its reaction products which may be adsorbed by the carbon. The steam also oxidizes hydrocarbons which may have escaped combination with the chlorin. In this stage of the process, limited oxidation of the active base is desirable to increase its porosity and it is reacted upon with steam until a suitable quantity of the carbon has been oxidized. The degree of porosity will be determined with reference to the intended use of the activated product. As I have shown in my application Serial No. 307,620, referred to above, an apparent density of about .66, for the carbon granules per se, is the optimum value for gas adsorbing carbon. Activated carbon destined for use in purifying or decolorizing liquids is preferably somewhat less dense.

It will be understood that the specific conditions will vary in accordance with the particular material being activated. The following procedure for preparing highly adsorptive carbon from wood charcoal is given for the sake of illustration. Wood charcoal, granulated preferably to 8 or 10 mesh fineness, is heated to about 350° C. The charcoal is maintained at this temperature while twice its weight of chlorin is slowly passed over it. The resulting carbon, containing adsorbed chlorin and chlorinated hydrocarbons is then treated with steam at about 700° C. for a short time, to remove the adsorbed substances. The carbon is allowed to cool before being discharged from the treating apparatus. Suitable means should be provided to prevent access of air to the discharged product.

The temperature of the steam should be increased if dense charcoal is being activated. About 950° C. is a suitable temperature when cocoanut charcoal is the material treated.

I have found that activated carbon produced in the manner described with a loss in weight of 15% is equally active with a product prepared by steam treatment alone with a 45% weight loss. The chlorin-steam process is particularly advantageous with readily oxidized materials, such as wood charcoal, but gives improved results also with the more difficultly oxidizable primary carbons. The maximum activity which may be imparted to carbon is greater when the process of the present inventions is adopted.

I am aware that it is claimed that decolorizing carbons have been prepared and revivified by processes involving a treatment, at temperature around a red heat, with chlorine gas. I have found in my experiments that such processes do not produce carbon which is highly active or which possesses any considerable decolorizing power. The failure of such processes is attributed in part to the fact that the materials produced quite probably are contaminated by chlorine and chlorinated compounds. Further, the prior processes are wasteful of chlorine in that the materials operated upon are not treated to remove the readily volatilizable substances before chlorine is introduced. Distillation and chlorination proceed simultaneously, with the result that a large part of the chlorine reacts with compounds which are not stabilized in the carbon and could be as well removed by heat alone. In distinction to such prior methods my invention resides in the treatment of a primary carbon by the combination of a chlorinating process regulated to remove adsorbed hydrocarbons without impairing the potentially active base with which they are associated, and a subsequent steam treatment by which the residues from the chlorination are removed and the active base is left in a highly adsorptive condition.

The process is not restricted to the use of pure chlorin and steam without admixture of other vapor or gas. For example, chlorin diluted with air or steam may be used, or a mixture of steam with carbon dioxid. Various other departures from the illustrative procedure described herein may be made within the scope of the appended claims.

I claim:

1. Process of making a highly adsorptive carbon, comprising subjecting a primary carbon consisting essentially of a complex of active carbon and adsorbed hydrocarbons, to treatment with a gaseous substance capable of forming removable compounds with such adsorbed hydrocarbons and incapable of materially oxidizing such active carbon, and introducing a fluid to eliminate the removable compounds.

2. Process of making a highly adsorptive carbon, comprising subjecting a primary carbon consisting essentially of a complex of active carbon and adsorbed hydrocarbons, to treatment with a gaseous reagent containing chlorin until substantially all of said hydrocarbons have reacted therewith, and thereafter treating the carbon with superheated steam.

3. Process according to claim 2, in which the active carbon is oxidized to a limited extent by the steam.

4. Process of making a highly adsorptive carbon, comprising removing chlorinaceous materials from potentially active carbon by subjecting such carbon to the action of steam.

5. Process according to claim 4, in which steam at a temperature between 700° and 950° C. is used.

6. Process of making a highly adsorptive carbon, comprising treating charcoal with chlorin at a temperature between 350° and 600° C., and thereafter acting upon the charcoal with steam at a temperature between 700° and 950° C.

7. Process of making a highly adsorptive carbon from charcoal of low density, comprising treating such charcoal with chlorin at a temperature of about 350° C., and thereafter acting upon the charcoal with steam at a temperature of about 700° C.

In testimony whereof, I affix my signature.

NEWCOMB K. CHANEY.